US011045935B2

(12) United States Patent
Hays et al.

(10) Patent No.: US 11,045,935 B2
(45) Date of Patent: Jun. 29, 2021

(54) NOSEPIECE ASSEMBLY WITH A HEAD SPRING FOR USE IN A POWERED NAILER

(71) Applicant: Black & Decker Inc., New Britain, CT (US)

(72) Inventors: James D. Hays, Bel Air, MD (US); Talon Curtis, Fallston, MD (US)

(73) Assignee: Black & Decker Inc., New Britain, CT (US)

( * ) Notice: Subject to any disclaimer, the term of this patent is extended or adjusted under 35 U.S.C. 154(b) by 199 days.

(21) Appl. No.: 15/972,508

(22) Filed: May 7, 2018

(65) Prior Publication Data

US 2019/0337136 A1    Nov. 7, 2019

(51) Int. Cl.
*B25C 7/00* (2006.01)
*B25C 1/00* (2006.01)
*B25C 1/06* (2006.01)
*F16B 15/08* (2006.01)

(52) U.S. Cl.
CPC ................. *B25C 7/00* (2013.01); *B25C 1/003* (2013.01); *B25C 1/06* (2013.01); *F16B 15/08* (2013.01)

(58) Field of Classification Search
CPC .. B25C 1/00; B25C 7/00; B25C 1/006; B25C 1/003; B25C 1/06; B25C 1/188; B25C 5/1693; B25C 5/16; F16B 15/08
USPC ...................... 227/18, 95, 113, 119, 120, 132
See application file for complete search history.

(56) References Cited

U.S. PATENT DOCUMENTS 1,688,879 A   10/1928  Polzer
1,709,756 A    4/1929  Szepe
2,667,639 A    2/1954  Schick
3,437,249 A *  4/1969  Baum ..................... B25C 1/005
                                                     227/120
4,389,012 A *  6/1983  Grikis .................... B25C 1/005
                                                     221/198
(Continued)

FOREIGN PATENT DOCUMENTS

EP    0927609 A2    7/1999
GB      176204     3/1922
(Continued)

OTHER PUBLICATIONS

Extended European Search Report dated Nov. 8, 2019 in counterpart European Patent Application No. 19172357.6.

*Primary Examiner* — Hemant Desai
*Assistant Examiner* — Jacob A Smith
(74) *Attorney, Agent, or Firm* — Harness, Dickey & Pierce, P.L.C.

(57) ABSTRACT

A nosepiece assembly for use in a powered nailer includes an outer portion defining an outer side of a drive channel. The drive channel is operable to receive a first nail of a collated strip of nails and guide the first nail out of the nosepiece assembly when the first nail is driven into a workpiece. The nosepiece assembly also includes a magazine-coupling portion coupled to the outer portion. The magazine-coupling portion includes a magazine connector and a spring. The magazine connector is coupleable to a magazine assembly to feed the collated strip of nails along a nail guide toward the drive channel and the spring is positioned adjacent to, but outside, the drive channel to bias at least one nail of the collated strip of nails into a seated position against a surface of the nail guide.

22 Claims, 6 Drawing Sheets

(56) References Cited

U.S. PATENT DOCUMENTS

| | | | | |
|---|---|---|---|---|
| 4,784,306 A * | 11/1988 | Baum | ................... | B25C 1/005<br>227/113 |
| 5,038,993 A | 8/1991 | Schafer et al. | | |
| 5,192,012 A * | 3/1993 | Schafer | ................... | B25C 1/001<br>227/113 |
| 5,452,835 A * | 9/1995 | Shkolnikov | ................ | B25C 7/00<br>227/8 |
| 5,579,975 A * | 12/1996 | Moorman | ................ | B25C 1/005<br>227/119 |
| 5,653,371 A * | 8/1997 | Hou | ..................... | B25C 1/005<br>227/109 |
| 6,260,519 B1 * | 7/2001 | Phillips | ................... | B25C 1/005<br>123/46 R |
| 6,478,209 B1 | 11/2002 | Bruins et al. | | |
| 6,779,700 B2 * | 8/2004 | Bruins | ................... | B25C 1/006<br>227/120 |
| 6,938,813 B1 * | 9/2005 | Chen | ...................... | B25C 1/00<br>227/120 |
| 6,968,945 B2 | 11/2005 | Bruins et al. | | |
| 7,004,368 B1 * | 2/2006 | Chen | ...................... | B25C 1/005<br>227/109 |
| 7,021,514 B2 * | 4/2006 | Beville | ................... | B25C 1/005<br>227/109 |
| 7,314,155 B2 * | 1/2008 | Moeller | ................. | B25C 1/005<br>227/109 |
| 7,344,058 B2 | 3/2008 | Bruins et al. | | |
| 7,389,901 B2 * | 6/2008 | Cho | ........................ | B25C 1/008<br>227/120 |
| 7,520,413 B1 * | 4/2009 | Cho | ........................ | B25C 1/005<br>227/109 |
| 7,677,426 B2 * | 3/2010 | Tillinghast | ............. | B25C 1/043<br>227/130 |
| 7,699,201 B2 * | 4/2010 | Hagan | ................... | B25C 1/003<br>227/135 |
| 7,721,928 B2 * | 5/2010 | Chen | ...................... | B25C 1/008<br>227/8 |
| 8,042,717 B2 * | 10/2011 | Lam | ....................... | B25C 1/008<br>227/7 |
| 8,231,039 B2 * | 7/2012 | Buck | ...................... | B25C 1/06<br>227/133 |
| 8,302,832 B2 * | 11/2012 | Porth | ..................... | B25C 1/08<br>227/120 |
| 8,371,489 B2 * | 2/2013 | Ogawa | ................... | B25C 1/188<br>227/119 |
| 8,439,242 B2 * | 5/2013 | Tanji | ..................... | B25C 1/008<br>227/8 |
| 8,733,608 B2 * | 5/2014 | Segura | .................. | B25C 1/005<br>227/120 |
| 8,899,460 B2 * | 12/2014 | Wojcicki | ................ | B25C 1/005<br>227/119 |
| 8,960,516 B2 * | 2/2015 | Iijima | ..................... | B25C 1/08<br>227/8 |
| 2002/0060234 A1 * | 5/2002 | Osuga | ................... | B25C 1/005<br>227/120 |
| 2003/0015565 A1 | 1/2003 | Lee | | |
| 2003/0057248 A1 * | 3/2003 | Bruins | .................. | B25C 5/1693<br>227/18 |
| 2003/0094477 A1 * | 5/2003 | Chen | ...................... | B25C 1/005<br>227/109 |
| 2006/0219751 A1 * | 10/2006 | Yang | ...................... | B25C 1/005<br>227/120 |
| 2006/0261128 A1 * | 11/2006 | Wen | ....................... | B25C 1/003<br>227/137 |
| 2007/0194077 A1 * | 8/2007 | Lee | ........................ | B25C 1/188<br>227/8 |
| 2007/0267457 A1 * | 11/2007 | Adachi | ................... | B25C 1/005<br>227/129 |
| 2008/0105725 A1 * | 5/2008 | Tamura | ................. | B25B 23/045<br>227/119 |
| 2008/0128468 A1 * | 6/2008 | Lee | ........................ | B25C 5/1658<br>227/120 |
| 2008/0245839 A1 * | 10/2008 | Osuga | ................... | B25C 1/005<br>227/129 |
| 2008/0257932 A1 * | 10/2008 | Nagata | .................. | B25C 1/184<br>227/120 |
| 2008/0272168 A1 * | 11/2008 | Buetow | ................. | B25C 5/1637<br>227/120 |
| 2008/0308597 A1 * | 12/2008 | Wojcicki | ................ | B25C 1/005<br>227/126 |
| 2009/0200354 A1 * | 8/2009 | Arata | ..................... | B25C 1/005<br>227/132 |
| 2009/0242607 A1 * | 10/2009 | Liu | ........................ | B25C 1/005<br>227/120 |
| 2009/0294502 A1 * | 12/2009 | Kunz | ..................... | B25C 5/1665<br>227/2 |
| 2010/0084452 A1 * | 4/2010 | Lee | .......................... | B25C 1/00<br>227/120 |
| 2011/0278342 A1 * | 11/2011 | Kuo | ........................ | B25C 1/001<br>227/120 |
| 2012/0187176 A1 * | 7/2012 | Wu | ......................... | B25C 5/1658<br>227/120 |
| 2012/0280015 A1 * | 11/2012 | Liao | ....................... | B25C 5/1637<br>227/119 |
| 2012/0298713 A1 * | 11/2012 | Ronconi | ................. | B25C 1/005<br>227/120 |
| 2013/0008936 A1 * | 1/2013 | Lee | ........................ | B25C 1/188<br>227/9 |
| 2013/0320062 A1 * | 12/2013 | Segura | .................. | B25C 1/005<br>227/109 |
| 2014/0361066 A1 * | 12/2014 | Liu | ........................ | B25C 1/005<br>227/119 |
| 2015/0076204 A1 * | 3/2015 | Maltais | ................. | B25C 5/1617<br>227/120 |
| 2016/0001431 A1 * | 1/2016 | Yang | ..................... | B25C 1/005<br>227/109 |
| 2017/0368671 A1 * | 12/2017 | Jaskot | .................... | B25C 1/005 |

FOREIGN PATENT DOCUMENTS

| | | |
|---|---|---|
| WO | WO-96/33051 A1 | 10/1996 |
| WO | WO-2008/049062 A1 | 4/2008 |

* cited by examiner

NOSEPIECE ASSEMBLY WITH A HEAD SPRING FOR USE IN A POWERED NAILER

FIELD

The present disclosure relates to a nosepiece assembly with a head spring for use in a powered nailer.

BACKGROUND

This section provides background information related to the present disclosure which is not necessarily prior art.

Fastening tools, such as power nailers have become relatively common place in the construction industry. Such nailers can include pneumatically-powered nailers, which are connected to an air compressor via an air hose, powder nailers, which employ a powder fuel source that is rapidly combusted to produce a volume of pressurized gas, and cordless electric nailers, which utilize an electric motor powered by a battery.

Such powered nailers can use strips of collated nails that are inserted into a magazine of the nailer. The nails separate from the collated nail strips when the nails are driven individually into workpieces by the powered nailers. The driver assembly of the powered nailers separates the individual nails from the collated strips of nails in addition to driving the nail into the workpiece.

SUMMARY

This section provides a general summary of the disclosure, and is not a comprehensive disclosure of its full scope or all of its features. In addition, any feature or combination of features included in this general summary is not necessarily critical or particularly important to the disclosure.

In accordance with an aspect of the disclosure, a nosepiece assembly for use in a powered nailer may include an outer portion defining an outer side of a drive channel. The drive channel is operable to receive a first nail of a collated strip of nails and guide the first nail out of the nosepiece assembly when the first nail is driven into a workpiece. The nosepiece assembly may also include a magazine-coupling portion coupled to the outer portion. The magazine-coupling portion includes a magazine connector and a spring. The magazine connector is coupleable to a magazine assembly to feed the collated strip of nails along a nail guide toward the drive channel and the spring is positioned adjacent to, but outside, the drive channel to bias at least one nail of the collated strip of nails into a seated position against a surface of the nail guide.

In accordance with another aspect of the disclosure, a powered nailer nosepiece assembly may include an outer portion defining an outer side of a drive channel. The drive channel is operable to receive a first nail of a collated strip of nails and guide the first nail out of the powered nailer nosepiece assembly. The nosepiece assembly may also include a magazine-coupling portion including a nail guide defined by a first side and a second side. The first side and the second side are positioned opposite to one another with a nail support ledge projecting transversely inward from the first side to guide the collated strip of nails toward the drive channel. The nosepiece assembly may also include a spring projecting into the nail guide to bias at least one nail of the collated strip of nails against the nail support ledge.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
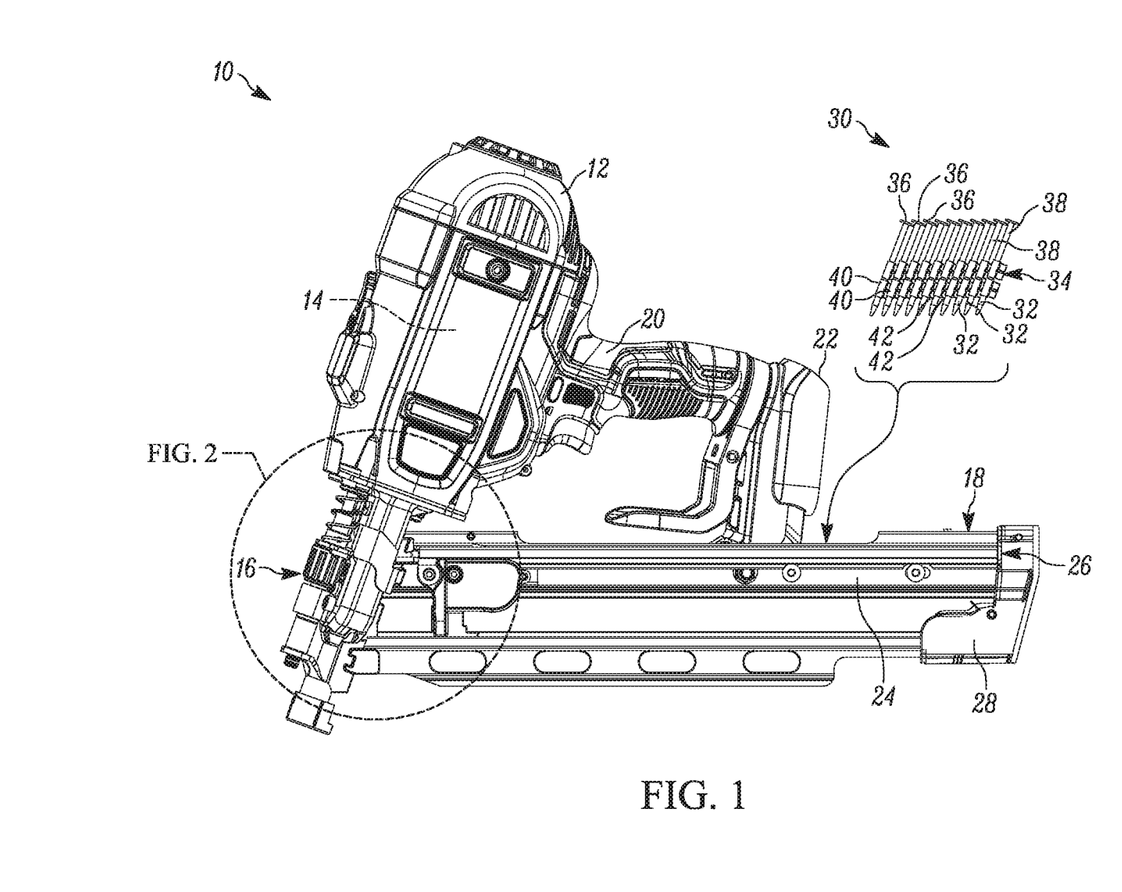
FIG. 1 is a side view of an exemplary powered nailer constructed in accordance with the teachings of the present disclosure.
Figure 2:
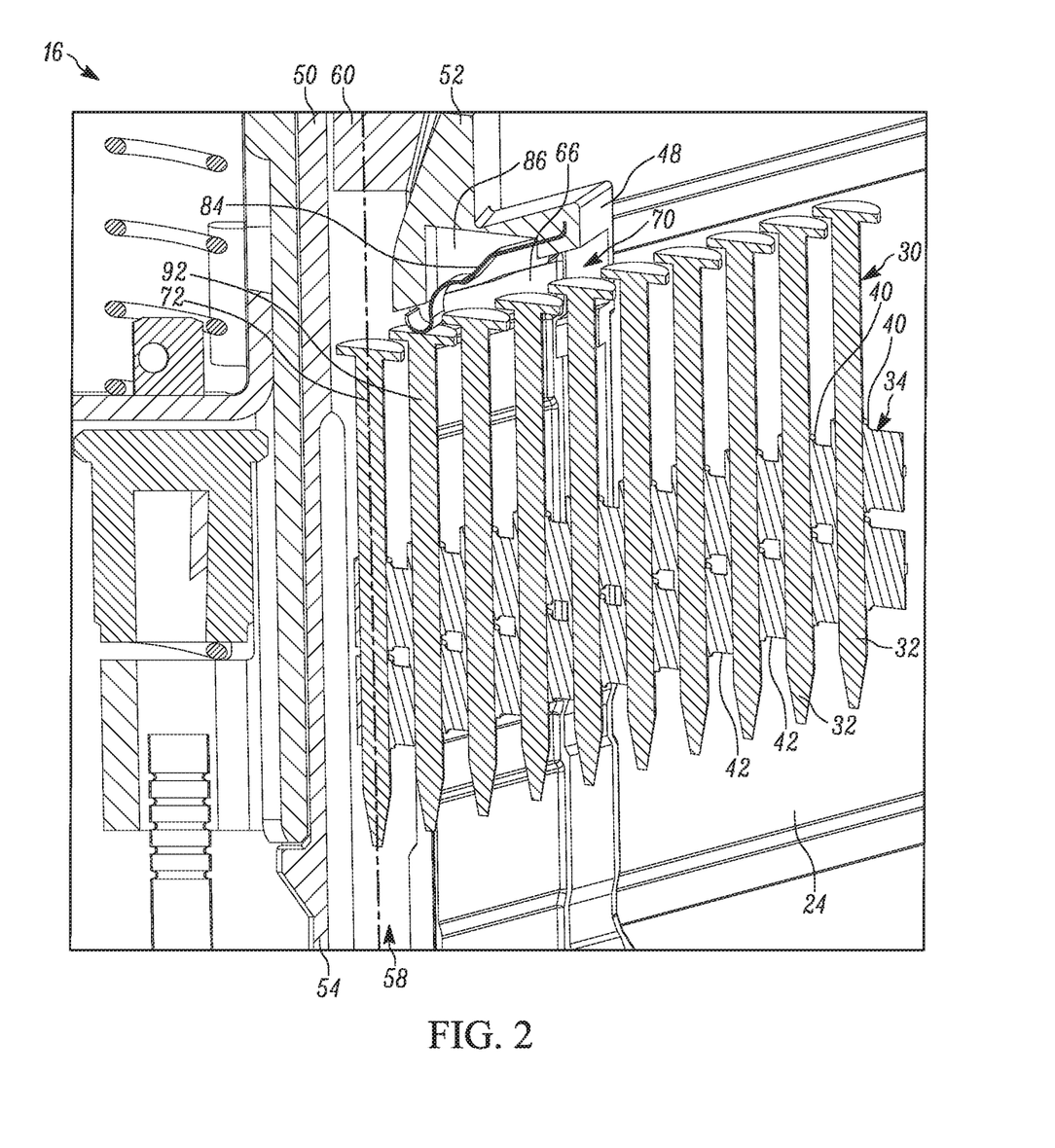
FIG. 2 is a sectional view of a portion of the exemplary powered nailer of FIG. 1 as shown along a cutting plane through the magazine and the nose assembly.

With reference to FIGS. 1 and 2 of the drawings, a powered nailer constructed in accordance with the teachings of the present disclosure is generally indicated by reference numeral 10. The powered nailer 10 can include a housing 12, a drive motor assembly 14, a nosepiece assembly 16, and a magazine assembly 18. The drive motor assembly 14 can be constructed in a conventional manner and as such, need not be described in detail herein. The housing 12 can be of a clam-shell construction that can be employed to cover various components of the nailer 10, such as the drive motor assembly 14 and related control components. The housing 12 can form a handle 20 that can be grasped by the operator of the nailer 10 during use. The housing 12 can also form a battery pack mount 22 to which the battery pack (not shown) can be fixedly but removably coupled.

As further shown, the magazine assembly 18 extends away from the nosepiece assembly 16 and is supported by a portion of the housing 12 located adjacent the battery pack mount 22. The magazine assembly 18 can be constructed in a conventional manner to hold a plurality of nails 30 and to feed such nails toward the nosepiece assembly 16. In one example, the magazine assembly 18 can include two opposing magazine side walls 24 that define a magazine track 26 therebetween. As can be appreciated, the magazine track 26 is sized accordingly to maintain the nails that are inserted into the magazine assembly 18 in an upright sequential position when the nails enter the nosepiece assembly 16. To assist in this regard, the magazine assembly 18 can include a pusher 28. The pusher 28 fits within the magazine track 26 and exerts a force against the nails to urge the nails toward the nosepiece assembly 16 in the magazine track 26.

In one example, as shown in FIGS. 1-6, the nailer 10 can accept one or more strips of collated nails 30 in the magazine assembly 18. In general, collated nails are individual nails 32 that are connected to one another via a substrate. The collated nails 32 are easier to load into the magazine assembly than individual nails. In addition, the collated strip of nails 32 can be loaded into the magazine assembly 18 more quickly than if the nails 32 are inserted individually. Various types of collated nails can be used such as nails connected together by plastic, paper, wire or other substrates. In the example shown, the collated strip of nails 30 connects the nails 32 together using a plastic collation 34. The collation 34 includes sleeves 40 that hold the shafts 38 of the nails 32 and bridging portions 42 that connect adjacent sleeves 40 to each other. The nails 32 are held in a position such that the center axes of the shafts 38 are positioned parallel to each other and the heads 36 of the nails 32 are positioned adjacent and overlapping one another as shown.

Figure 3:
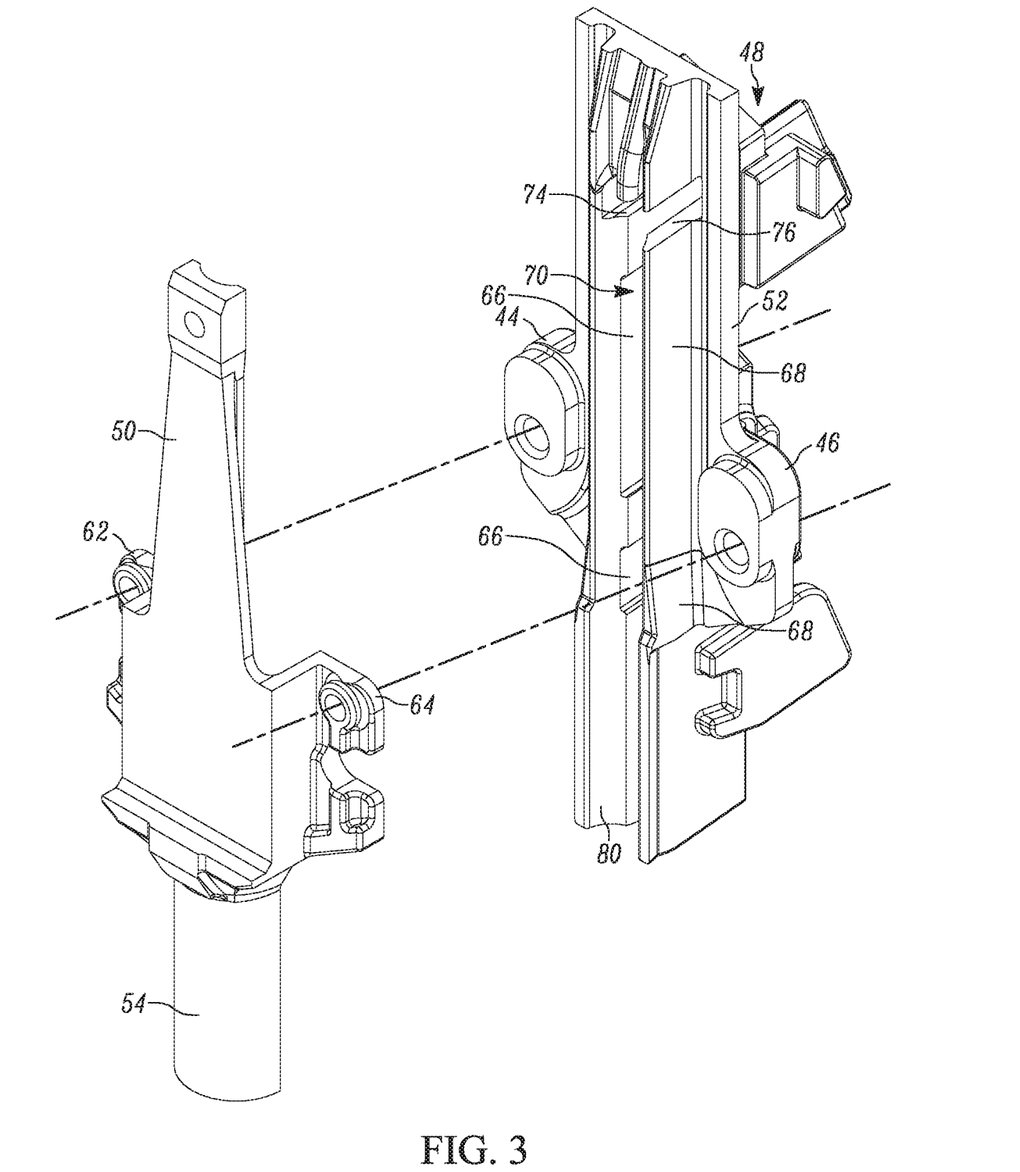
FIG. 3 is an exploded perspective view of an exemplary nosepiece assembly of the powered nailer of FIG. 1.
Figure 4:
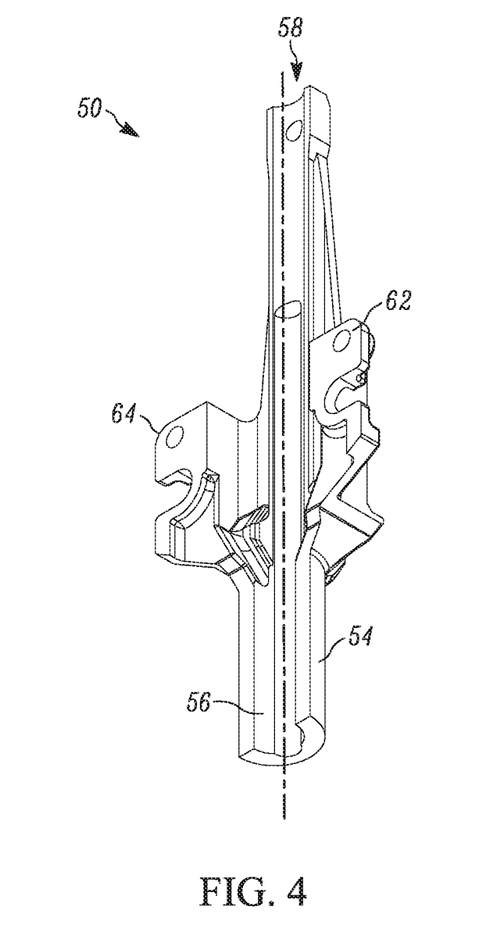
FIG. 4 is view of a drive portion of the example nosepiece assembly of the FIG. 3.

As stated above, one or more collated strips of nails 30 can be inserted into the magazine assembly 18. The one or more collated strips of nails 30 can be inserted through the top of the magazine assembly 18 and then guided longitudinally along the magazine track 26 into the nosepiece assembly 16. The nosepiece assembly 16, as shown in FIG. 3, can include an outer portion 50 and a magazine-coupling portion 52. The outer portion 50 and the magazine-coupling portion 52 are coupled together and can be connected to the nailer 10. The nosepiece assembly 16 receives the nails 32 from the magazine assembly 18, positions the nails 32 in a predetermined location and then guides the nails 32 from a nose 54 of the nailer 10 when the nails 32 are driven into a workpiece by the drive motor assembly 14.

The terms longitudinal, axial and/or transverse may be used to describe the positioning, location or direction of various aspects of the nailer 10. For purposes of the present disclosure, the terms longitudinal, transverse and axial shall have the meanings described below unless otherwise explicitly stated or such alternate meaning is clearly described or shown. The term longitudinal means a direction or orientation that is substantially parallel to the direction of travel of the nails 32 as the nails 32 travel along the magazine assembly 18 in the magazine track 26 (i.e. in a direction from the pusher 28 toward the nosepiece assembly 16). The term transverse (or lateral) means a direction substantially perpendicular to the longitudinal direction. The term axial refers to a direction along a center axis of one or more of the nails 32 of the collated strip of nails 30.

As shown in FIGS. 2-6, the outer portion 50 of the nosepiece assembly 16 includes an inner wall 56 that, together with inner wall 80 of the magazine-coupling portion 52, can define a drive channel 58. A drive blade 60 travels through the drive channel 58 and contacts a nail 32 that is positioned in the drive channel 58 to drive the nail 32 out of the nosepiece assembly 16 and into a workpiece. The outer portion 50 may also include a first connector wing 62 and a second connector wing 64. The first connector wing 62 and the second connector wing 64 can mate with an opposing first connector wing 44 and an opposing second connector wing 46 on the magazine-coupling portion 52 to connect the outer portion 50 to the magazine-coupling portion 52.

The magazine-coupling portion 52, as previously described, mates to the outer portion 50. As shown, the magazine-coupling portion 52 can include a magazine connector 48 with a first side 66 and a second side 68. The first side 66 and the second side 68 are positioned opposite to one another and form a nail guide 70 that extends through the magazine-coupling portion 52. The nail guide 70 can be sized so as to receive and guide the collated strip of nails 30 through the magazine-coupling portion 52. When the magazine-coupling portion 52 is coupled to the outer portion 50, a first nail 72 of the collated strip of nails 30 is positioned in the drive channel 58. In this position, the first nail 72 is in a drive-ready position to be contacted by the drive blade 60 and driven out of the nosepiece assembly 16 and into a workpiece.

The magazine-coupling portion 52, in the example shown, can also include a nail support ledge 74. The nail support ledge 74 is positioned at an axial position adjacent to and under the heads 36 of the nails 32 when the collated strip of nails 30 is positioned in the magazine-coupling portion 52. The nail support ledge 74, in the example shown, extends along the first side 66 in the longitudinal direction along the nail guide 70. The nail support ledge 74 can also project transversely inward from the first side 66. As can be appreciated, the magazine-coupling portion 52 can also include an opposing nail support ledge 76 that extends along the second side 68 opposite to the nail support ledge 74. The opposing nail support ledge 76 can also project transversely inward into the nail guide 70 toward the nail support ledge 74. In this configuration, a ledge width of the nail guide 70 between the nail support ledge 74 and the opposing nail support ledge 76 is smaller than a head width of the nail guide 70 between the first side 66 and the second side 68 at an axial position above the nail support ledge 76. In this manner, the head 36 of the nails 32 can fit between the first side 66 and the second side 68 at the head width but the head 36 cannot fit between the nail support ledge 74 and the opposing nail support ledge 76. In this manner, the heads 36 of the nails 32 can abut the nail support ledge 74 and the opposing nail support ledge 76. As such, the nails 32 can be limited from moving axially in the nail guide 70.

In existing tool designs, the nails 32 and/or the collated strips of nails 30 can move axially in the nail guide 70. As can be appreciated, the nailer 10 is manipulated by a user in a variety of orientations when the nailer 10 is being operated. The nailer 10 may be oriented at 45 degrees, 90 degrees, 180 degrees or other orientations relative to the orientation of the nailer shown in FIG. 1. In such orientations, gravity and/or the movement of the nailer 10 can cause the nails 32 and/or the collated strips of nails 30 to move inside the nail guide 70. Such movement is possible because an axial gap exists between the heads 36 of the nails 32 and a cap wall 78 of the magazine-coupling portion 52. As shown, the cap wall 78 is connected between the first side 66 and the second side 68. The cap wall 78 further defines the nail guide 70 in the magazine-coupling portion 52. In the example shown, the axial gap between the nail support ledge 76 and the cap wall 78 is larger than an axial height of the nails 32 when the heads 36 of the nails 32 abut the nail support ledge 76. As such, the nails 32 can move axially in existing designs when the nailer 10 is rotated or moved, for example when the nailer 10 is rotated 180 degrees (upside down) from the orientation of the nailer 10 shown in FIG. 1.

In existing designs, the movement of the nails 32 (and/or of the collated strips of nails 30) in the nail guide 70 can cause the nailer 10 to jam or to result in other operating problems. Such operating problems can occur because the first nail 72 is not sheared from the collated strip of nails 30 in a clean or repeatable manner. Such shearing issues can result because energy that is supplied by the drive motor assembly 14 to the drive blade 60 is not consistently transferred to the first nail 72 when the drive blade contacts the first nail 72.

For example, in existing designs where the collated strip of nails 30 is permitted to move axially in the nail guide 70, the first nail 72 moves axially before the collated strip of nails 30 moves into a seated position against the nail support ledge 74. Energy from the drive blade 60 is inconsistently transferred to the first nail 72 when the collated strip of nails 30 moves from an unseated position (i.e., the heads 36 of the nails 32 of the collated strip of nails 30 are not abutting the nail support ledge 74 and/or the opposing nail support ledge 76) to a seated position (at least one head 36 of the nails 32 of the collated strip of nails 30, other than the first nail 72, abuts the nail support ledge 74 and/or the opposing nail support ledge 76).

Once the collated strip of nails 30 is moved to the seated position, the energy of the drive blade against the first nail 72 causes the first nail 72 to shear from the collation 34. If the drive blade 60 moves the first nail 72 axially before the collated strip of nails 30 is in the seated position, the first nail 72 can inconsistently shear from the collation 34. Such inconsistency can cause the material of the collation 34 to have undesirable shapes, to shear in inconsistent patterns and/or to result in collation chips and/or remnants that can cause jamming or other operational problems.

The nosepiece assembly 16 of the present disclosure limits the amount of permitted axial movement of the collated strip of nails 30. The nosepiece assembly 16 of the present disclosure positions the first nail 72 in a repeatable position, regardless of the orientation of the nailer 10, in which at least one of the heads 36 of the nails 32 is in a seated position abutting the nail support ledge 74 and/or the opposing nail support ledge 76. As shown in the example of the present disclosure, the magazine-coupling portion 52 includes a spring 84. The spring 84, in this example, biases the collated strip of nails 30 against the nail support ledge 74 and/or the opposing nail support ledge 76. In this manner, axial movement of the collated strip of nails 30 is limited.

Figure 5:
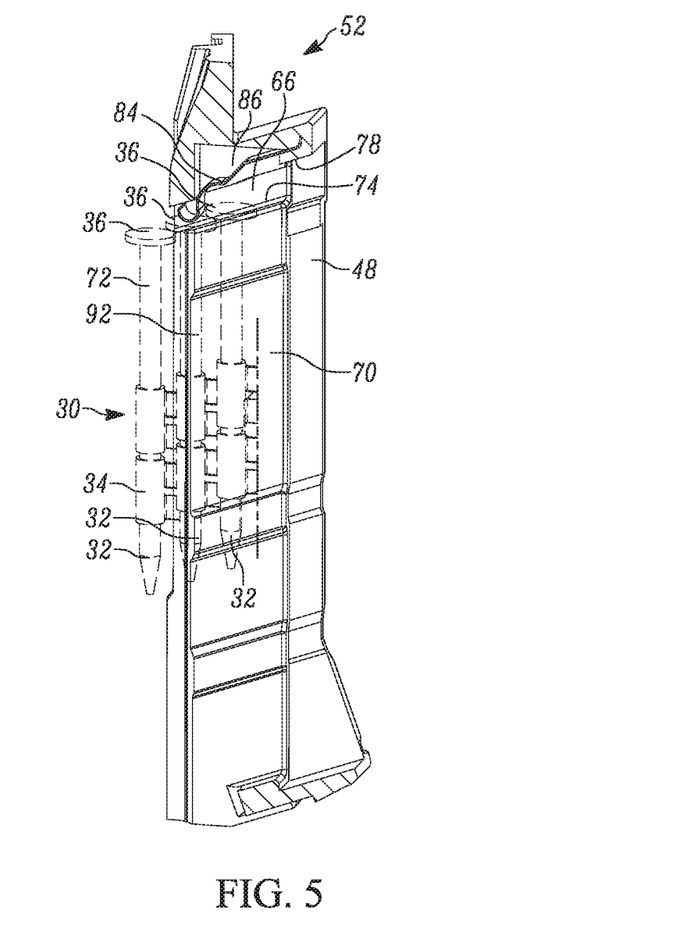
FIG. 5 is a sectional view of a magazine-coupling portion with a spring of the example nosepiece assembly of FIG. 3.
Figure 6:
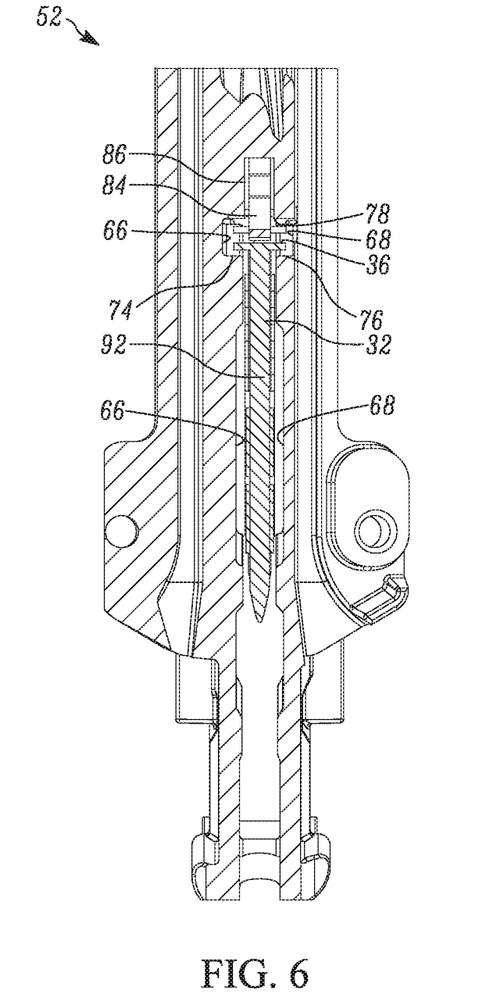
FIG. 6 is a sectional view of the magazine-coupling portion of FIG. 5 looking into the nail guide and cut along a plane through a second nail positioned in the nail guide.

As shown in FIGS. 5 and 6, the spring 84 can be positioned in a spring cavity 86 that is defined within the magazine-coupling portion 52 at the cap wall 78. The spring cavity 86 is positioned in the cap wall 78 at an axial position opposite to the heads 36 of the nails 32. The spring cavity 86, in the example shown, is elongated along the longitudinal direction and is positioned opposite to the nail support ledge 74 and to the opposing nail support ledge 76.

As further shown in the example of FIGS. 5 and 6, the spring 84 includes a spring arm 88 extending between a coupling end 82 and a nail-contacting foot 90. The spring arm 88 can be connected to the magazine-coupling portion 52 by the spring arm 88 in the spring cavity 86. As shown, the spring 84 can be connected to the magazine-coupling portion 52 in the spring cavity 86 in a cantilevered position in which the coupling end 82 is connected and the spring arm 88 extends away therefrom. The spring arm 88 can extend longitudinally inside the spring cavity 86 as shown. The nail-contacting foot 90 can project axially outward from the spring cavity 86 and contact a second nail 92 of the collated strip of nails 32. The nail-contacting foot 90 of the spring 84 can have a transverse width that is smaller than a diameter of the heads 36 of the nails 32. The nail-contacting foot 90 includes a curved shape in this example. Such a shape can permit the nails 32 to contact a leading or trailing edge of the spring 84 and to longitudinally move past the spring 84 as the nails 32 of the collated strip of nails 30 is fed through the nail guide 70.

The spring 84, in this example, biases the second nail 92 (and, in turn, biases the collated strip of nails 30) into a seated position against the nail support ledge 74 and/or the opposing nail support ledge 76. Such bias limits axial movement of the collated strip of nails 30 in the nail guide 70 and can repeatably position the first nail 72 in a driver-ready position in the drive channel 58. In the example shown, the spring 84 exerts a biasing force in a direction substantially parallel to the drive direction of the first nail 72. The spring 84 can be positioned adjacent to and outside the drive channel 58 in contact with the second nail 92. In this position, the spring 84 can limit axial movement of the collated strip of nails 30 without interfering with the drive blade 60 and/or the drive motor assembly 14.

In the example shown, the spring 84 contacts the second nail 92 of the collated strip of nails 30. In other examples, the spring 84 can contact one or more of the nails 32 of the collated strip of nails 30 to bias the collated strip of nails 30 into the seated position. In still other examples, the nosepiece assembly 16 can include a biasing member that contacts the collation 34 of the collated strip of nails 30 to bias the collated strip of nails 30 in the seated position.

Figure 7:
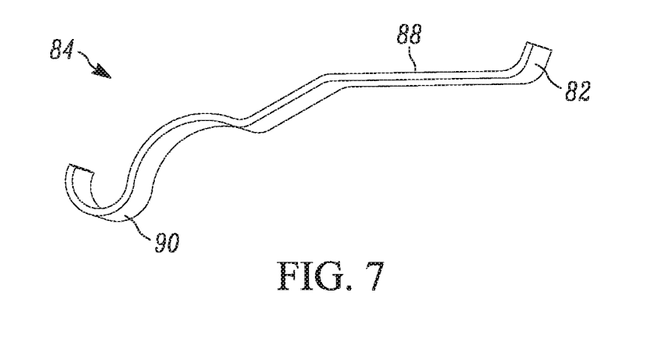
FIG. 7 is a perspective view of the spring of FIG. 5.

As shown in FIG. 7, the spring 84 is a formed length of spring steel. In other examples, the spring 84 can be formed of other elastically deformable materials such as plastics, natural or synthetic rubbers or the like. In addition, the spring 84 can have alternate shapes or profiles so as to bias the collated strip of nails 30 into a seated position.

The foregoing description of an example embodiment has been provided for purposes of illustration and description. It is not intended to be exhaustive or to limit the disclosure. Individual elements or features of a particular embodiment are generally not limited to that particular embodiment, but, where applicable, are interchangeable and can be used in a different embodiment, even if not specifically shown or described. The same may also be varied in many ways. Such variations are not to be regarded as a departure from the disclosure, and all such modifications are intended to be included within the scope of the disclosure.

What is claimed is:

1. A nosepiece assembly for use in a powered nailer comprising:

an outer portion defining an outer side of a drive channel, the drive channel operable to receive a first nail of a collated strip of nails and guide the first nail out of the nosepiece assembly when the first nail is driven into a workpiece; and a magazine-coupling portion coupled to the outer portion, the magazine-coupling portion including a magazine connector, a nail guide, and a spring provided as part of, and mounted on, the magazine coupling portion, the spring being positioned adjacent to, but outside, the drive channel to bias at least one nail of the collated strip of nails into a seated position against a surface of the nail guide;

wherein the magazine connector of the magazine-coupling portion of the nosepiece assembly is designed to couple a magazine assembly to the nosepiece assembly to enable feeding of the collated strip of nails from a nail track of the magazine assembly to the nail guide of the magazine-coupling portion of the nosepiece assembly.

2. The nosepiece assembly of claim 1 wherein the at least one nail of the collated strip of nails is a second nail of the collated strip of nails, and the spring contacts the second nail, the second nail located outside the drive channel.

3. The nosepiece assembly of claim 1 wherein the spring biases the collated strip of nails by exerting a force against the at least one nail of the collated strip of nails other than the first nail.

4. The nosepiece assembly of claim 1 wherein the spring biases a head of the at least one nail of the collated strip of nails against a nail support ledge positioned adjacent to the spring in the magazine-coupling portion.

5. The nosepiece assembly of claim 1 wherein the surface of the nail guide is a nail support ledge that projects inward from a side of the nail guide.

6. The nosepiece assembly of claim 1 wherein the nail guide of the magazine-coupling portion includes a nail support ledge and a nail-guiding side wall that defines the nail guide in the magazine-coupling portion, the spring projecting into the nail guide to bias the collated strip of nails toward the nail support ledge.

7. The nosepiece assembly of claim 1 further comprising the magazine assembly coupled to the magazine-coupling portion, the magazine assembly defining a nail track aligned with the nail guide for guiding the collated strip of nails toward the spring.

8. The nosepiece assembly of claim 1 wherein the spring extends from a spring cavity in the magazine-coupling portion in a cantilevered arrangement.

9. The nosepiece assembly of claim 1 wherein the spring includes a nail-contacting foot, the spring connected to the magazine-coupling portion in a spring cavity with the nail-contacting foot projecting out of the spring cavity.

10. The nosepiece assembly of claim 9 wherein the nail-contacting foot has an arcuate shape.

11. The nosepiece assembly of claim 1 wherein:
the drive channel has a longitudinal axis; and
the spring biases the at least one nail of the collated strip of nails in a biasing direction substantially parallel to the longitudinal axis of the drive channel.

12. The powered nailer nosepiece assembly of claim 1 wherein the spring is coupled to the magazine-coupling portion by a proximal end of the spring being mounted in a spring coupling slot of the magazine-coupling portion.

13. A cordless powered nailer comprising the nosepiece assembly of claim 1.

14. A powered nailer nosepiece assembly comprising:
an outer portion defining an outer side of a drive channel, the drive channel operable to receive a first nail of a collated strip of nails and guide the first nail out of the powered nailer nosepiece assembly;
a magazine-coupling portion including a nail guide defined by a first side and a second side, the first side and the second side positioned opposite to one another with a nail support ledge projecting laterally inward from the first side to guide the collated strip of nails toward the drive channel; and
a spring provided as part of, and mounted on, the magazine coupling portion and projecting into the nail guide to bias at least one nail of the collated strip of nails against the nail support ledge;
wherein the magazine-coupling portion of the nosepiece assembly is designed to couple a magazine assembly to the nosepiece assembly to enable feeding of the collated strip of nails from a nail track of the magazine assembly to the nail guide of the magazine-coupling portion of the nosepiece assembly.

15. The powered nailer nosepiece assembly of claim 14 wherein the at least one nail of the collated strip of nails is positioned outside the drive channel.

16. The powered nailer nosepiece assembly of claim 14 wherein the nail support ledge projects laterally inward from the first side at an axial position adjacent to a head of the at least one nail of the collated strip of nails.

17. The powered nailer nosepiece assembly of claim 16 wherein the magazine-coupling portion includes an opposing nail support ledge that projects inward into the nail guide from the second side opposite to the nail support ledge.

18. The powered nailer nosepiece assembly of claim 14 wherein the spring is positioned adjacent to, but outside of, the drive channel.

19. The powered nailer nosepiece assembly of claim 14 wherein the spring has a lateral width that is less than a diameter of a head of the at least one nail of the collated strip of nails.

20. The powered nailer nosepiece assembly of claim 14 wherein the spring includes a nail-contacting foot that projects out of a spring cavity into the nail guide toward the nail support ledge.

21. The powered nailer nosepiece assembly of claim 20 wherein the nail-contacting foot has a curved shape with a contact surface that is smaller than a head of the at least one nail of the collated strip of nails.

22. The powered nailer nosepiece assembly of claim 14 wherein the spring is coupled to the magazine-coupling portion by a proximal end of the spring being mounted in a spring coupling slot of the magazine-coupling portion.

* * * * *

UNITED STATES PATENT AND TRADEMARK OFFICE
CERTIFICATE OF CORRECTION

PATENT NO. : 11,045,935 B2  
APPLICATION NO. : 15/972508  
DATED : June 29, 2021  
INVENTOR(S) : Hays et al.

Page 1 of 1

It is certified that error appears in the above-identified patent and that said Letters Patent is hereby corrected as shown below:

In the Claims

Column 7 Line 29 Claim 12, after "The", delete "powered nailer"

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*